(12) United States Patent
Kasboske (10) Patent No.: US 8,944,823 B2
(45) Date of Patent: Feb. 3, 2015

(54) PRODUCT IDENTIFICATION SYSTEM FOR PERSONS WITH LIMITED VISION

(76) Inventor: George Kasboske, Hickory Hills, IL (US)

( * ) Notice: Subject to any disclaimer, the term of this patent is extended or adjusted under 35 U.S.C. 154(b) by 1068 days.

(21) Appl. No.: 12/322,728

(22) Filed: Feb. 6, 2009

(65) Prior Publication Data

US 2010/0200449 A1    Aug. 12, 2010

(51) Int. Cl.
```
G09B 21/00      (2006.01)
G09F 3/00       (2006.01)
G09F 23/00      (2006.01)
A47F 7/28       (2006.01)
```

(52) U.S. Cl.
CPC .............. G09B 21/003 (2013.01); G09F 3/00 (2013.01); G09F 23/00 (2013.01); *A47F 7/286* (2013.01); *B65D 2203/02* (2013.01)
USPC ........... 434/112; 434/113; 220/670; 220/671; 206/549.5; 186/35; 186/36; 186/52

(58) Field of Classification Search
CPC .... G09B 21/00; G09B 21/003; G09B 21/009; G09B 21/004; G09B 21/006; G09B 21/02; G09B 21/001; G09B 21/09; G09B 21/007; A62B 3/00; A61H 3/066; A62C 33/00; G04B 25/02; A47J 47/18; B21D 51/2646; B65D 1/44; B65D 1/42; B65D 1/165; B65D 1/265; B65D 7/045; B65D 7/46; B65D 2203/00; B65D 5/4229; B65D 75/54; B65D 25/205; B65D 5/422
USPC ............ 434/112–116; 116/DIG. 17; 220/670; 220/671; 206/549.5
See application file for complete search history.

(56) References Cited

U.S. PATENT DOCUMENTS

| | | | | |
|---|---|---|---|---|
| 2,098,557 A | * | 11/1937 | Thomas | 40/630 |
| 4,275,274 A | * | 6/1981 | English | 369/22 |
| 5,428,914 A | * | 7/1995 | Whitehouse et al. | 40/621 |
| 5,580,251 A | * | 12/1996 | Gilkes et al. | 434/113 |
| 6,109,922 A | * | 8/2000 | Litschel et al. | 434/114 |
| 6,170,712 B1 | * | 1/2001 | Kasboske | 222/215 |
| 6,188,391 B1 | * | 2/2001 | Seely et al. | 345/173 |
| 6,488,794 B1 | * | 12/2002 | Bright et al. | 156/86 |
| 6,706,552 B2 | * | 3/2004 | Getz et al. | 438/100 |

(Continued)

FOREIGN PATENT DOCUMENTS

WO    WO2004090839 A1 * 10/2004  ............. B32B 15/04

OTHER PUBLICATIONS

English Translation of WO 2004090839 A1.*

(Continued)

*Primary Examiner* — Jeffrey Shapiro
(74) *Attorney, Agent, or Firm* — Wood, Phillips, Katz, Clark & Mortimer (57) ABSTRACT

A method of facilitating the identification of portable consumer articles at a point of purchase display, the method including the steps of: providing a plurality of portable consumer articles each with tactilely sensible information thereon that identifies at least one of: a) a general nature of the article and/or its contents; and b) a provider of the article; and displaying the plurality of articles at the point of purchase display in a manner that allows potential consumers to lift and handle each of the plurality of articles so as to thereby readily determine through tactile sensing of the information at least one of: a) the general nature of the handled article and/or its contents; and b) the provider of the handled article.

16 Claims, 5 Drawing Sheets

(56) References Cited

U.S. PATENT DOCUMENTS

| | | |
|---|---|---|
| 7,267,281 B2 * | 9/2007 | Hopkins .................. 235/462.45 |
| 7,920,131 B2 * | 4/2011 | Westerman ................... 345/173 |
| 2002/0021925 A1 * | 2/2002 | Nagase ...................... 400/109.1 |
| 2003/0151597 A1 * | 8/2003 | Roberts et al. ................ 345/173 |
| 2007/0049367 A1 * | 3/2007 | Kralik .............................. 463/1 |
| 2007/0113451 A1 * | 5/2007 | McDowell et al. ........ 40/642.02 |
| 2007/0247429 A1 * | 10/2007 | Westerman ................... 345/168 |
| 2008/0076593 A1 * | 3/2008 | Costa et al. ................... 473/316 |
| 2011/0025602 A1 * | 2/2011 | Sivan et al. ................... 345/156 |

OTHER PUBLICATIONS

STIC Search Report, pp. 1-10, dated Apr. 14, 2011.*
Proposed Amendment, dated Aug. 25, 2014.*

* cited by examiner

PRODUCT IDENTIFICATION SYSTEM FOR PERSONS WITH LIMITED VISION

BACKGROUND OF THE INVENTION

1. Field of the Invention

This invention relates to consumer products available for inspection at point of purchase and, more particularly, to a system for facilitating product identification for persons with limited vision.

2. Background Art

Myriad systems and devices have been devised to assist the day-to-day functioning of those with limited or impaired vision. The objective of those who design such systems and devices is to make it possible for those with limited vision to function as safely and efficiently throughout their day as those without such limitations. Much of the focus in this area has been upon facilitating the assimilation of written information that is pervasive in people's lives. Such information is important on a daily basis as people navigate, shop, dine, etc. Among the resources currently available to facilitate information conveyance to those with limited vision are braille labeling systems, scanning readers, etc.

Braille is probably the oldest and most common visual assistance system. Where braille is available, an individual can tactilely identify information that is placed on surfaces in proximity to locations or products relative to which such information relates.

One limitation with braille is that it has a letter/number-by-letter/number correspondence with alphanumeric characters. Thus, reading an extensive amount of information in braille can be time consuming, even for individuals skilled in this task.

An exemplary environment in which this last limitation is significant is at point of purchase where consumers shop and make decisions as to purchase based upon product inspection. While the inventor herein is not aware that braille identification is even offered on products in stores such as those that sell groceries, etc., even if it were available, as commonly used, braille, as conventionally used, is to a certain extent impractical. For example, if all the information on grocery store products was provided in braille, a consumer would have an onerous and time consuming chore inspecting multiple products in the multitude of aisles and shelves typical of most consumer product establishments. The user would be required to pore through large amounts of information borne on each product/article to identify information that is significant in terms of affecting a purchasing decision.

As an alternative to the use of braille, the aforementioned scanning readers might be used for product identification. These scanners address certain of the above issues. For example, scanners allow a user to quickly identify potentially all written information that may appear on a particular product. However, scanners have other problems peculiar to their own design.

First of all, a reliable scanner currently demands a significant financial investment. The costs may be out of the budget range of a significant percentage of the population. Use of a lesser quality unit may lead to problems in terms of speed, accuracy, reliability, etc.

Further, while scanners allow relatively rapid identification of information, generally this information is more detailed than necessary to allow a purchasing decision to be made. Having to sort through large quantities of useless information is time consuming and potentially tiring to a user of such scanning equipment.

Additionally, if the scanner fails, or the owner does not have the unit on his/her person at the appropriate times, it is not possible for that person to make any product identification. The need to at all times have on hand an assist unit also inherently detracts from an individual's self-sufficiency throughout the day.

Designers continue to investigate alternative systems and devices that simplify and make more efficient the lives of those with visual limitations.

SUMMARY OF THE INVENTION

In one form, the invention is directed to a method of facilitating the identification of portable consumer articles at a point of purchase display. The method includes the steps of: providing a plurality of portable consumer articles each with tactilely sensible information thereon that identifies at least one of: a) a general nature of the article and/or its contents; and b) a provider of the article; and displaying the plurality of articles at the point of purchase display in a manner that allows potential consumers to lift and handle each of the plurality of articles so as to thereby readily determine through tactile sensing of the information at least one of: a) the general nature of the handled article and/or its contents; and b) the provider of the handled article.

In one form, the step of displaying the plurality of articles involves displaying a plurality of like articles in groups upon shelves.

In one form, the step of providing a plurality of portable consumer articles involves providing a plurality of articles each having a container for edible product contents.

In one form, the step of displaying the plurality of articles involves displaying the articles upon shelves in aisles grouped upon the shelves by product category with different product categories in first and second different aisles. The method further includes the step of providing tactilely sensible information that identifies product categories in the first and second aisles.

In one form, the method further includes the step of developing a system for correlating a tactilely sensible shape with at least one of: a) a product category; and b) a general nature of an article.

In one form, the step of providing a plurality of portable consumer articles involves providing articles wherein the tactilely sensible information is in the form of braille.

In one form, the step of providing a plurality of portable consumer articles involves providing articles wherein the tactilely sensible information is not in the form of braille.

In one form, the step of displaying the plurality of articles involves displaying the articles upon shelves in aisles grouped upon the shelves by product category with different product categories in first and second different aisles. The method further includes the step of audibly alerting a potential consumer to a product category in at least one of the first and second aisles as an incident of the potential consumer approaching or entering the at least one of the first and second aisles.

In one form, the step of displaying the plurality of articles involves displaying the articles so that potential consumers can tactilely sense both: a) the general nature of a handled article and/or its contents; and b) the provider of the handled article.

In one form, the step of providing a plurality of portable consumer articles involves providing articles each having a container bounding a volume and with accordion folds that can be reconfigured to change the volume of the container.

In one form, the step of providing a plurality of portable consumer articles involves providing articles configured so that edible contents can be forcibly discharged by reconfiguring the accordion folds.

In one form, the step of providing a plurality of portable consumer articles involves providing articles configured to be grasped in one hand of a user and squeezed by the one hand to reconfigure the accordion folds and forcibly discharge the edible contents from the container.

The invention is further directed to a portable consumer article including: a container; a product in the container; and tactilely sensible information upon the container that identifies at least one of: a) a general nature of the container and/or product; and b) a provider of the product.

In one form, the product in the container is an edible product.

In one form, the container has a volume for the product and is reconfigurable to change the volume of the container.

In one form, the container has accordion folds that are reconfigurable to change the volume of the container.

In one form, the tactilely sensible information is in the form of braille.

In one form, the tactilely sensible information is not in the form of braille.

In one form, the container is configured to be held in a hand of a user and squeezed to change the volume of the container.

In one form, the container has a discrete depression within which the tactilely sensible information resides.

In one form, the container has a raised rim extending around a space within which the tactilely sensible information resides.

BRIEF DESCRIPTION OF THE DRAWINGS

FIG. 8 is a representation of one form of tactilely sensible information that might be used to identify products/articles according to the invention;

FIG. 9 is a view as in FIG. 6 of a modified form of tactilely sensible information;

FIG. 10 is a view as in FIGS. 6 and 7 of a further modified form of tactilely sensible information;

DETAILED DESCRIPTION OF THE PREFERRED EMBODIMENTS

While the invention has utility in virtually limitless different environments, one exemplary environment will be described hereinbelow, with it being understood that the invention is not so limited in its application.

Figure 1:
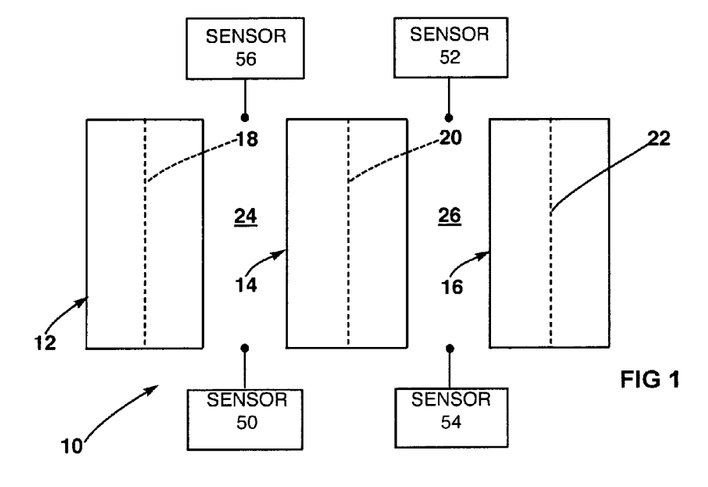
FIG. 1 is a schematic, plan representation of a point of purchase display location with a series of product/article supporting shelving units.

In FIG. 1, a point of purchase display is shown at 10 for portable consumer articles/products, which are unlimited in terms of their possible form. For example, the articles may be edible grocery store products, consumer electronics, hardware items, etc.

In this embodiment, three like shelving units 12, 14, 16 are provided. The shelving units 12, 14, 16 are each two-sided, with vertical dividing walls 18, 20, 22, respectively. Aisles 24, 26 are provided between shelving units 12, 14 and 14, 16 to allow consumers to navigate therebetween and identify what is displayed on the shelving units 12, 14 16.

Figure 2:
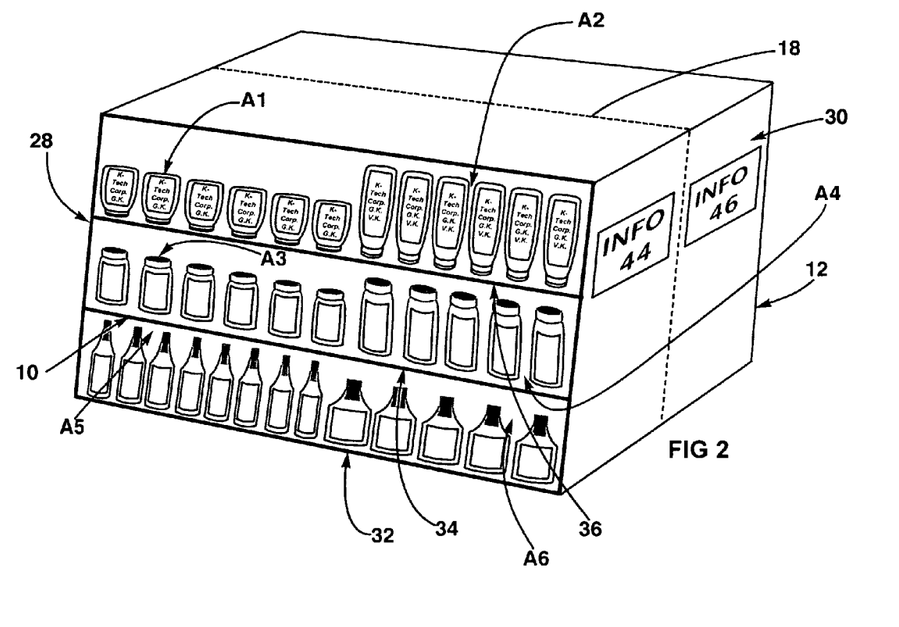
FIG. 2 is an enlarged, perspective view of one of the shelving units in FIG. 1 and having tactilely sensible information thereon and with products/articles on shelves on the shelving unit in turn having tactilely sensible information thereon according to the invention.

As seen in FIG. 2, the exemplary shelving unit 12 has spaced end walls 28, 30 and a plurality of horizontally extending shelves 32, 34, 36, spaced vertically from each other to efficiently accommodate groups of portable consumer articles A1, A2, A3, A4, A5, A6. The articles in the groups A1, A2, A3, A4, A5, A6 are different.

Typically, like categories of portable consumer articles are collectively displayed together. For example, one navigating the aisle 24 would be exposed to different portable consumer articles in a particular category over at least part of the extent of the aisle 24 that are different in category then those articles viewable in the aisle 26. This is a conventional display manner and facilitates ready consumer access.

The categories may be differentiated by the general nature of the product, i.e. cleaning, edible, hardware, electronics, etc. The general nature of the category may be further differentiated on a more specific level. For example edible products may be identified as a condiment, baking need, soda, etc., and potentially even at a more specific level, i.e. ketchup, baking soda, spice, a particular type of spice, etc. Regardless of what level of specificity there is as to the general nature of the product/article, the potential consumer is allowed to quickly and efficiently determine whether the product/article is of interest, without assimilating other more specific information that does not affect a decision to purchase, i.e. specific ingredients in a multi-ingredient product, warnings, laudatory marketing information, etc.

As just one example, if a potential consumer is looking to purchase canned beans, he/she wants to be able to efficiently inspect canned vegetables grouped in an aisle to quickly eliminate the products in which there is no interest without poring through product information thereon irrelevant to the selection process.

For those that are visually limited, the invention affords two different manners to facilitate navigation to a desired product category. In one form, shown in FIG. 2, tactilely sensible information 44, 46 is provided on the end wall 30, and potentially on the end wall 28, though not shown thereon in FIG. 2. The information 44, 46 may be in the form of braille or in another form, as explained below.

With a potential consumer in proximity, or at the entry, to the aisle 24 near the end wall 30, he/she can tactilely sense the information 44 prior to entering the aisle 24. He/she can do likewise preparatory to entering the aisle 26. Through this mechanism, a potential consumer with visual limitations can conveniently navigate to the desired aisle for a targeted product category.

As an alternative to the use of the information 44, 46, sensors 50, 52, 54, 56 can be provided near the entry locations for each of the aisles 24, 26 independent of the products. The sensors 50, 52, 54, 56 detect the presence of a potential consumer by detecting only the presence of the mass of a potential consumer him-/herself and emit a message, such as one that is recorded and identifies the product category, but not any specific product identity, in the particular aisle 24, 26 for the potential consumer.

Once in the appropriate aisle, each of the articles on the shelves 32, 34, 36 can be tactilely inspected by a potential consumer. With the representative product/article 60 in FIGS. 3-6, a container 62 is provided with product contents 64 that may be edible or nonedible in nature. The latter might be a cleaning product, an electronic component for which the container 62 defines a housing or casing, etc. The container 62 has tactilely sensible information 66, shown generically thereon in FIG. 3, that identifies at least one, and in one preferred form, both, of: a) a general nature of the article and/or its contents; and b) a provider of the product. By lifting and handling the article 60, the information 66 can be locally tactilely sensed, thereby allowing the consumer to readily determine at least one of: a) the general nature of the handled article; and b) the provider of the handled article.

Figures 3, 4, 7:
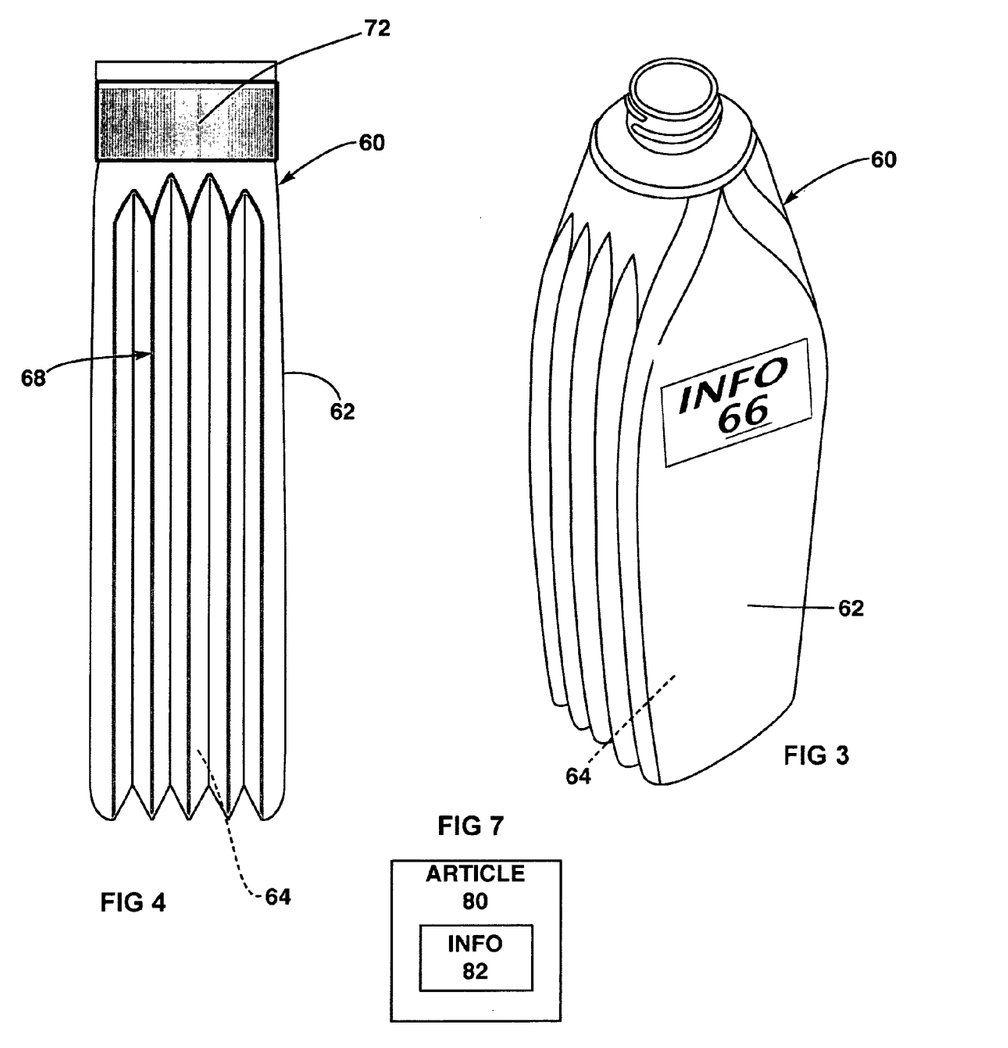
FIG. 3 is a front elevation view of one form of product/article on the shelving unit in FIG. 2 with tactilely sensible information shown generically thereon.
FIG. 4 is a side elevation view of the product/article in FIG. 3.
FIG. 7 is a schematic representation of a product/article with tactilely sensible information thereon according to the present invention.

The information 66 may be in the form of braille or non-braille in form. The objective of the particular information application is to allow a potential consumer a "quick read" as to the nature of the product without being burdened with details regarding information that is unnecessary to affect his/her purchasing decision. The container 62 is useful to store, and allow discharge of, flowable contents such as ketchup, mustard, toothpaste, etc. The information 66 may identify the contents generically as ketchup and/or identify the provider thereof that may be the manufacturer or distributor.

In the form shown, the container 62 incorporates accordion folds at 68 as shown in U.S. Pat. No. 6,170,712, the disclosure of which is incorporated herein by reference. Through this arrangement, the user can grasp and squeeze the container 62 with one hand to change its volume, thereby to potentially forcibly discharge the contents thereof.

Figures 5, 6:
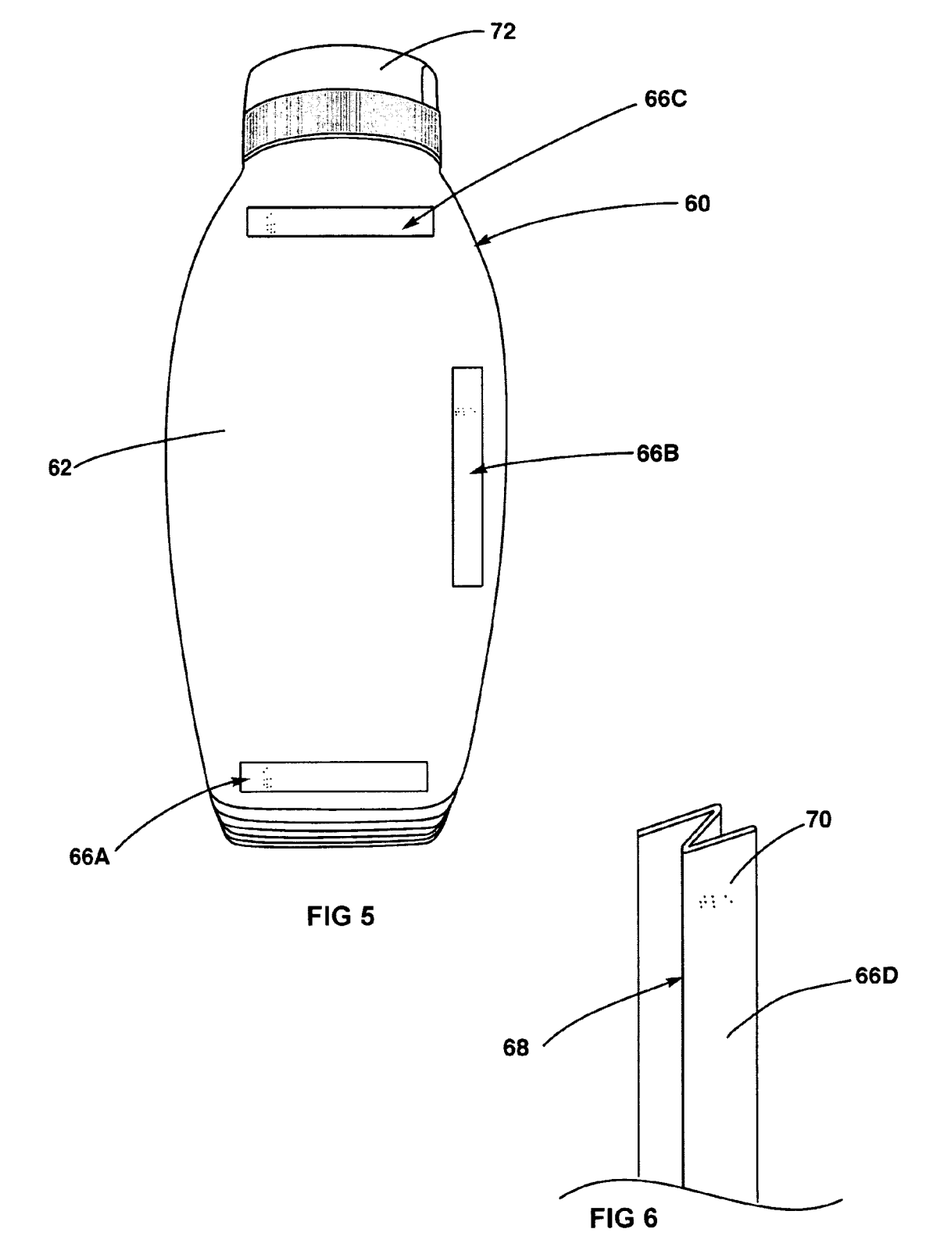
FIG. 5 is a view of the product/article in FIGS. 3 and 4 with tactilely sensible information shown in different locations thereon.
FIG. 6 is a fragmentary, perspective view of accordion folds on the product/article in FIGS. 3-5, with tactilely sensible information thereon.

In FIG. 5, information in braille form is shown on the container 62 at three different potential locations at 66A, 66B, 66C. In FIG. 6, information in braille form is shown on a wall 70 on one of the accordion folds 68 at 66D. These are but exemplary locations for the application of the information. As one alternative location, the information may be on the cap 72.

The use of accordion folds is particularly desirable for certain products, such as condiments at restaurants, etc. Again, at a restaurant or other eating establishment, a user can quickly, through the information 66, determine the general nature/category of product without taking the time or being burdened with other information that might be determinable as through a conventional type scanner used to read coded information.

In FIG. 7, a generic article is shown at 80 to which braille or non-braille information 82 is provided to allow determination of the general nature/category of the article and/or its contents. This Figure is intended to encompass virtually an unlimited type of portable products/articles with which the present invention can be used.

The invention also contemplates that for facilitated identification, various symbols might be devised that might become commonly accepted by those with visual limitations to facilitate quick identification of product nature or category. For example, as shown in FIGS. 8-10, representative symbols are shown that might be arbitrarily adopted to be tactilely sensed to give an identification of a certain type of product. For example, in FIG. 10 the X might identify a non-edible product category without further more specific identification that becomes burdensome detail. As an example, a separate symbol such as that in FIG. 8 or FIG. 9 might more specifically identify household cleaning products/articles, or the like. Another symbol may be even more specific without departing from the identification of only the general nature of the product. For example, the symbol might identify "laundry soap".

As seen in FIG. 2, the potential consumer is conveniently allowed to access particular product categories. Once in an appropriate aisle, he/she can pick up articles in different groups, identified at A1, A2, A3, A4, A5, A6, and quickly discern the general nature thereof and/or the provider thereof, to thereby promptly facilitate a purchasing decision.

As also noted, the same type of article has particular utility in publicly accessible and frequented establishments that offer the use of certain portable articles, such as condiments, etc., as in eating establishments.

Another aspect of the invention is the provision of structure on the container 62 to facilitate the placement of, and subsequent location of, tactilely sensible information, such as information that is conveyed through braille.

Figures 11, 13, 14:
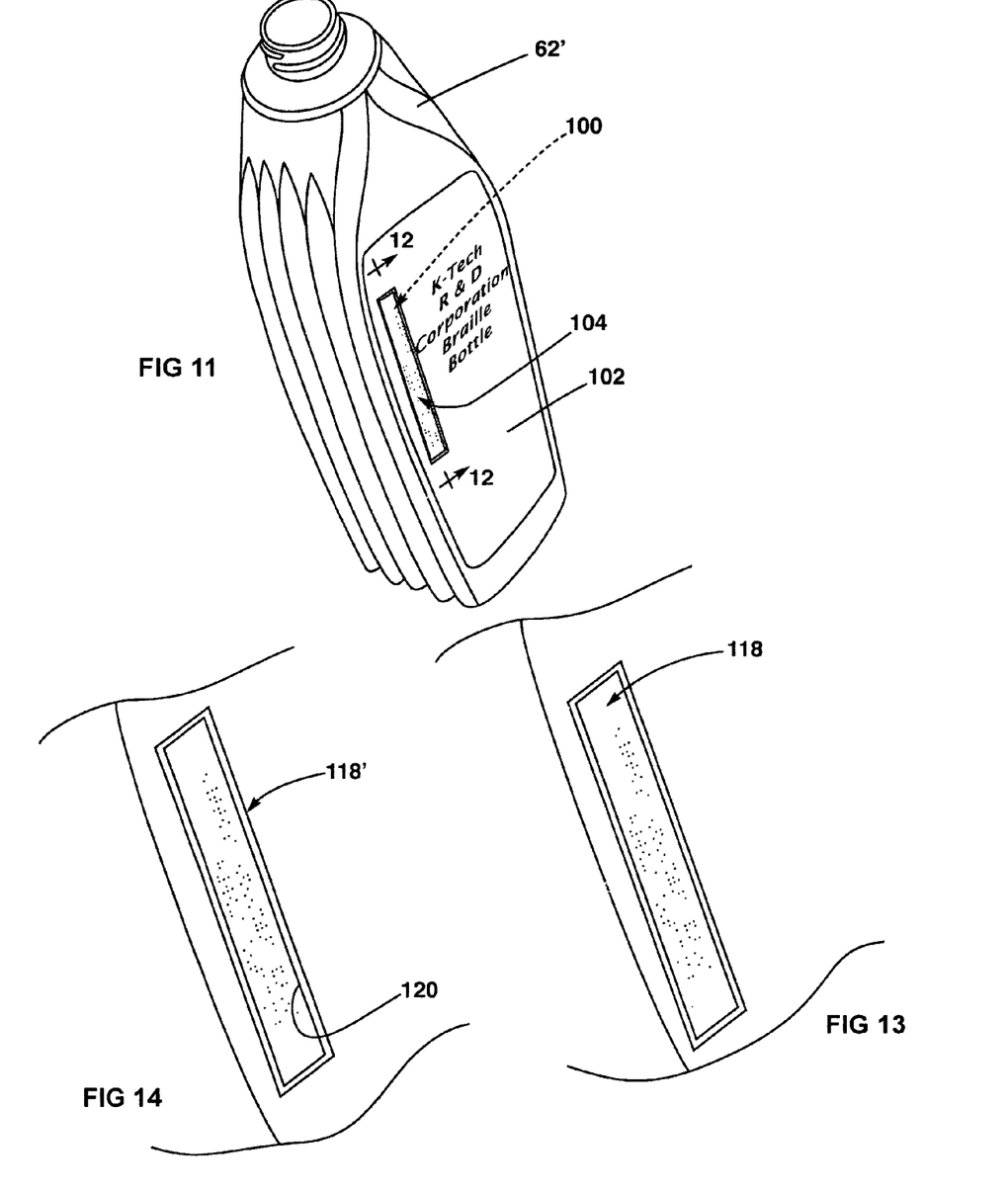
FIG. 11 is a perspective view of a modified form of a container, according to the invention, and having a depression within which tactilely sensible information is provided.
FIG. 13 is an enlarged, perspective view of a label applied over the depression in FIG. 11.
FIG. 14 is a view as in FIG. 13 of a modified form of a label that can be used at the depression on the container in FIG. 11.
Figure 12:
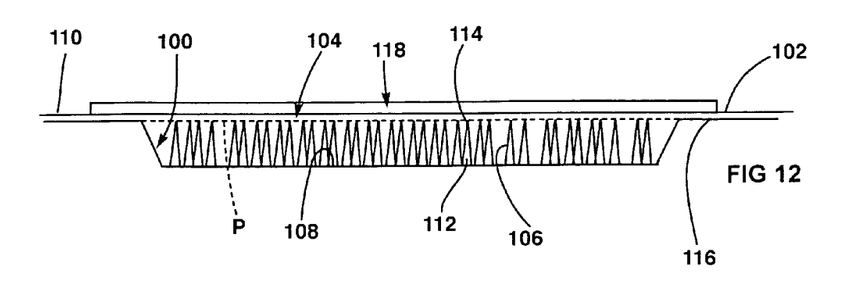
FIG. 12 is a cross-sectional view of the container depression taken along line 12-12 of FIG. 11.

More particularly, as shown on the container 62' in FIG. 11, a depression 100 is provided within one wall 102 on the container 62'. The precise location at which the depression 100 is provided is not critical, however, it is preferred that the depression 100 can be readily sensed by an individual grasping the container 62' normally to effect inspection thereof. The user can preliminarily sense the depression 100, whereafter information at 104, represented by braille or other tactilely sensible or readable means, can be interpreted by a prospective purchaser. As seen in FIG. 12, the depression 100 is integrally formed, as through a molding process, with the wall 102.

In the embodiment shown in FIGS. 11 and 12, the information at 104 is defined by discrete protrusions 106 that are likewise formed integrally with the wall 102 at a wall portion 108, spaced from the main section 110 of the wall 102.

The protrusions 106, which collectively are placed in a braille pattern, each has a tapered body 112 that terminates at a relatively sharp, distal end 114. The ends 114 terminate at a common plane P approximately coincident with the inside surface 116 of the wall 102.

The depression 100 may remain open so that the protrusions 106 are exposed to be tactilely sensed. Alternatively, a discrete label 118 can be applied to the wall 102 to span the depression 100 so as to cover the depression 100. The depression has a lengthwise dimension with the discrete label having a substantially flat shape between spaced ends with a length between the spaced ends that spans the lengthwise dimension of the depression. As depicted, the length of the discrete label between the spaced ends is only slightly greater than the lengthwise dimension of the depression. The label 118 may fully cover the depression 100 and may be sufficiently thin and flexible to be deformed into the depression 100 whereupon a user can sense the distal ends 114 of the protrusions 106 through the label 118. The label 118 is shown spaced from the distal ends 114 so that the user must locally deform the label to move against the distal ends 114 to "read" the information. The thickness and nature of the material making up the label 118 are chosen so that preferably the user can tactilely "read" the information 104 without applying a significant amount of pressure to the label 118.

As an alternative, a label 118', as shown in FIG. 14, may have a framed construction with a central opening/cutout 120 through which the protrusions 106 are directly exposed to be directly tactilely sensed.

Figures 15, 16, 17, 18, 19:
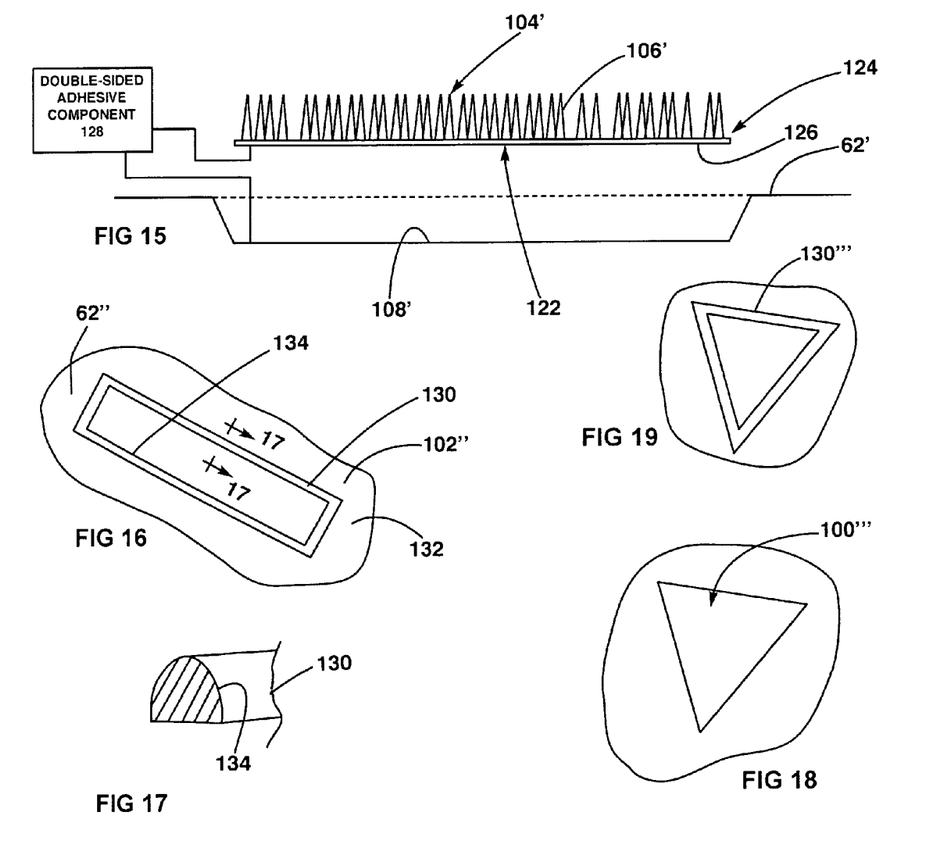
FIG. 15 is a view corresponding to that in FIG. 12 of a modified form of tactilely sensible information that is applied through the use of a separate sticker.
FIG. 16 is a fragmentary, perspective view of a raised rim upon a container as in FIG. 11 and bounding a space within which tactilely sensible information can be provided.
FIG. 17 is a cross-sectional view of the rim, taken along line 17-17 of FIG. 16.
FIG. 18 is a fragmentary, perspective view of a portion of a container with a depression as in FIG. 11 with a specific shape corresponding to a product characteristic.
FIG. 19 is a view corresponding to FIG. 18 wherein a raised rim is provided extending around a space within which tactilely sensible information is provided.

As an alternative to integrally forming the protrusions 106 with the wall 102, a separate, self-contained sub-assembly 122 may be applied to a corresponding wall portion 108', as shown at FIG. 15. The sub-assembly 122 may be in the form of a sticker at 124, made up of a backing layer 126 with which protrusions 106' are integrally formed or to which the protrusions 106' are separately attached in a pattern that allows tactile sensing of the information 104'.

The backing layer 126 may be affixed to the wall portion 108' as by an adhesive or a double-sided adhesive component 128.

The protrusions 106' may be directly exposed or covered by a label (not shown) corresponding to the label 118, described above.

In FIGS. 16 and 17, a further modification is shown wherein a raised rim 130 projects upwardly from a surface 132 of a wall 102", corresponding to the wall 102 on a container 62". The rim 130 bounds a space 134 within which braille, or other tactilely sensible form of information placement, can be placed using, for example, the structure shown in FIGS. 11-15.

The rim 130 provides a convenient locator for braille, or the like. A user can quickly pass his/her hand over the container 62" to locate the rim 130 and thus the tactilely sensible information that resides therewithin. The aforementioned depression 100 potentially performs the same location function for a user.

In another aspect of the invention, the shape of a depression as at 100, for braille or the like, may be made to itself be indicative of a particular product type. For example, as shown in FIG. 18, the depression 100'" is shown triangular in shape, which may represent edible or non-edible categories, or may be more specific as to product type.

In FIG. 18, a raised rim 130'" is shown in the same configuration to perform the same function in terms of identification as well as bounding a space for information that is in the form of braille, or the like.

The various depressions and raised rims may be strategically sized and shaped to best-facilitate location of information and make the information readily readable by a user.

The use of a sticker 124 as in FIG. 15 is desirable from the standpoint of manufacturing convenience. It is possible for a supplier of products to make a generic container 62' that will accommodate different products that can be appropriately identified with different stickers 124 selected with the appropriate information 104' thereon.

The various labels may incorporate printed information that is viewable to either characterize the braille, or the like, or to convey information that is complementary to that conveyed through the braille, or the like.

The foregoing disclosure of specific embodiments is intended to be illustrative of the broad concepts comprehended by the invention.

The invention claimed is:

1. A portable consumer article comprising:
a container;
a product in the container; and
tactilely sensible information upon the container that identifies at least one of: a) a general nature of the container; b) a general nature of the product; and c) a provider of the product,
the tactilely sensible information comprising protrusions and a discrete label over the protrusions through which the protrusions can be sensed by a user,
wherein the container has a discrete depression within which the tactilely sensible information resides,
the discrete depression having a lengthwise dimension,
the discrete label having a substantially flat shape between spaced ends with a length between the spaced ends that spans the lengthwise dimension of the depression,
the protrusions each having a tapered body that terminates at a sharp distal end that is detectable by deforming the label against the protrusions, the protrusions arranged in a fixed pattern to provide the tactilely sensible information upon the container.

2. The portable consumer article according to claim 1 wherein the product in the container is an edible product.

3. The portable consumer article according to claim 1 wherein the container has a volume for the product and is reconfigurable to change the volume of the container.

4. The portable consumer article according to claim 3 wherein the container has accordion folds that are reconfigurable to change the volume of the container.

5. The portable consumer article according to claim 3 wherein the tactilely sensible information is in the form of Braille.

6. The portable consumer article according to claim 3 wherein the container is configured to be held in a hand of a user and squeezed to change the volume of the container.

7. The portable consumer article according to claim 3 wherein the container has a wall with a surface and a raised rim extending outwardly from the wall surface and around a space within which the tactilely sensible information resides.

8. The portable consumer article according to claim 1 wherein the tactilely sensible information is not in the form of Braille.

9. The portable consumer article according to claim 1 wherein the length of the discrete label between the spaced ends is only slightly greater than the lengthwise dimension of the depression.

10. The portable consumer article according to claim 1 wherein the protrusions are formed integrally with the container.

11. The portable consumer article according to claim 1 wherein the protrusions are formed as part of a sub-assembly that is attached to the container.

12. The portable consumer article according to claim 1 wherein the protrusions each has a tapered body that terminates at a sharp distal end that is sensed through the discrete label.

13. The portable consumer article according to claim 12 wherein the label is spaced from the sharp distal ends so that a user is required to locally deform the label to move against the sharp distal ends to sense the sharp distal ends.

14. A portable consumer article comprising:
    a container;
    a product in the container; and
    tactilely sensible information upon the container that identifies at least one of: a) a general nature of the container; b) a general nature of the product; and c) a provider of the product,
    the tactilely sensible information comprising protrusions and a label over the protrusions through which the protrusions can be sensed by a user,
    wherein the container has a wall with an exposed outer surface and a raised rim extending outwardly from the exposed outer wall surface and around a space within which the tactilely sensible information resides,
    the tactilely sensible information comprising fixed protrusions each with a fixed tapered body that terminates at a sharp distal end that is detectable by deforming the label against the protrusions.

15. The portable consumer article according to claim 14 wherein the tactilely sensible information is in the form of Braille.

16. The portable consumer article according to claim 14 wherein the raised rim extends outwardly from the exposed outer wall surface fully around the space.

\* \* \* \* \*